United States Patent [19]

Huff et al.

[11] Patent Number: 5,330,204
[45] Date of Patent: * Jul. 19, 1994

[54] NON-IMPACT KEYLESS CHUCK

[75] Inventors: Robert O. Huff, Piedmont; Paul T. Jordan, Seneca; William F. Forquer, West Union, all of S.C.

[73] Assignee: Jacobs Chuck Technology Corporation, Wilmington, Del.

[*] Notice: The portion of the term of this patent subsequent to Jun. 30, 2009 has been disclaimed.

[21] Appl. No.: 99,160

[22] Filed: Jul. 29, 1993

Related U.S. Application Data

[60] Continuation of Ser. No. 884,205, May 18, 1992, Pat. No. 5,253,879, which is a division of Ser. No. 449,722, Dec. 11, 1989, Pat. No. 5,125,673.

[51] Int. Cl.⁵ .......................... B23B 31/10
[52] U.S. Cl. ........................ 279/62; 279/902
[58] Field of Search ................. 279/60–65, 279/902

[56] References Cited

U.S. PATENT DOCUMENTS

| | | | |
|---|---|---|---|
| 897,335 | 9/1908 | Almond . | |
| 911,012 | 1/1909 | Jacobs . | |
| 1,123,541 | 1/1915 | Jacobs . | |
| 1,526,328 | 2/1925 | Englund . | |
| 2,292,470 | 8/1942 | Ostberg | 279/60 |
| 2,684,856 | 7/1954 | Stoner | 279/61 |
| 3,589,486 | 6/1971 | Kelch | 192/46 |
| 3,813,827 | 6/1974 | Bloch | 51/219 R |
| 3,927,892 | 12/1975 | Pradota | 279/62 |
| 4,252,333 | 2/1981 | Vogel | 279/72 |
| 4,275,893 | 6/1981 | Bilanceri | 279/64 |
| 4,305,597 | 12/1981 | McCarty | 279/22 |
| 4,423,881 | 1/1984 | Whitehead | 279/62 |
| 4,460,296 | 7/1984 | Sivertson | 408/124 |
| 4,575,108 | 3/1986 | Whitehead | 279/59 |
| 4,648,608 | 3/1987 | Smith | 279/1 K |
| 4,660,841 | 4/1987 | Chouinard | 279/61 |
| 4,664,394 | 5/1987 | Theissig et al. | 279/1 ME |
| 4,682,918 | 7/1987 | Palm | 408/241 R |
| 4,695,065 | 9/1987 | Komatsu et al. | 279/60 |
| 4,702,122 | 10/1987 | Richard | 74/412 TA |
| 4,817,971 | 4/1989 | Flynn | 279/1 K |
| 4,840,387 | 6/1989 | McCarthy | 279/1 K |
| 4,842,288 | 6/1989 | Ando | 279/62 |
| 4,951,955 | 8/1990 | Sakamaki | 279/62 |
| 5,125,673 | 6/1992 | Huff et al. | 279/60 |

FOREIGN PATENT DOCUMENTS

| | | |
|---|---|---|
| 3439668 | 4/1986 | Fed. Rep. of Germany . |
| 63-216604 | 9/1988 | Japan . |
| 661643 | 11/1951 | United Kingdom . |
| 89/03267 | 4/1989 | World Int. Prop. O. . |

OTHER PUBLICATIONS

Bosch Catalog No. 890,021, Sep. 1990, pp. 15 and 17.
Yukiwa "Products" brochure.

*Primary Examiner*—Steven C. Bishop
*Attorney, Agent, or Firm*—Robert R. Jackson; G. Victor Treyz

[57] ABSTRACT

A non-impact keyless chuck suitable for use with manual or powered drivers is disclosed. The chuck comprises a body which carries a rotatable split nut having a relatively fine thread and a plurality of slidable jaws, which may be identical, driven by the rotatable nut. An anti-friction bearing is disposed between the rotatable nut and a bearing thrust ring mounted on the body. A clutch or torque limiting mechanism is provided to limit the tightening torque to a predetermined value while the loosening torque may be limited or unlimited. The front sleeve, and rear sleeve, if used, may be formed from a structural plastic to reduce manufacturing costs. A relatively soft elastomeric grip boot may be placed on the front sleeve to improve the grip and temporarily restrain and center the tool during chuck tightening or loosening operations. A relatively soft elastomeric grip boot may also be placed on the rear sleeve, if used.

30 Claims, 5 Drawing Sheets

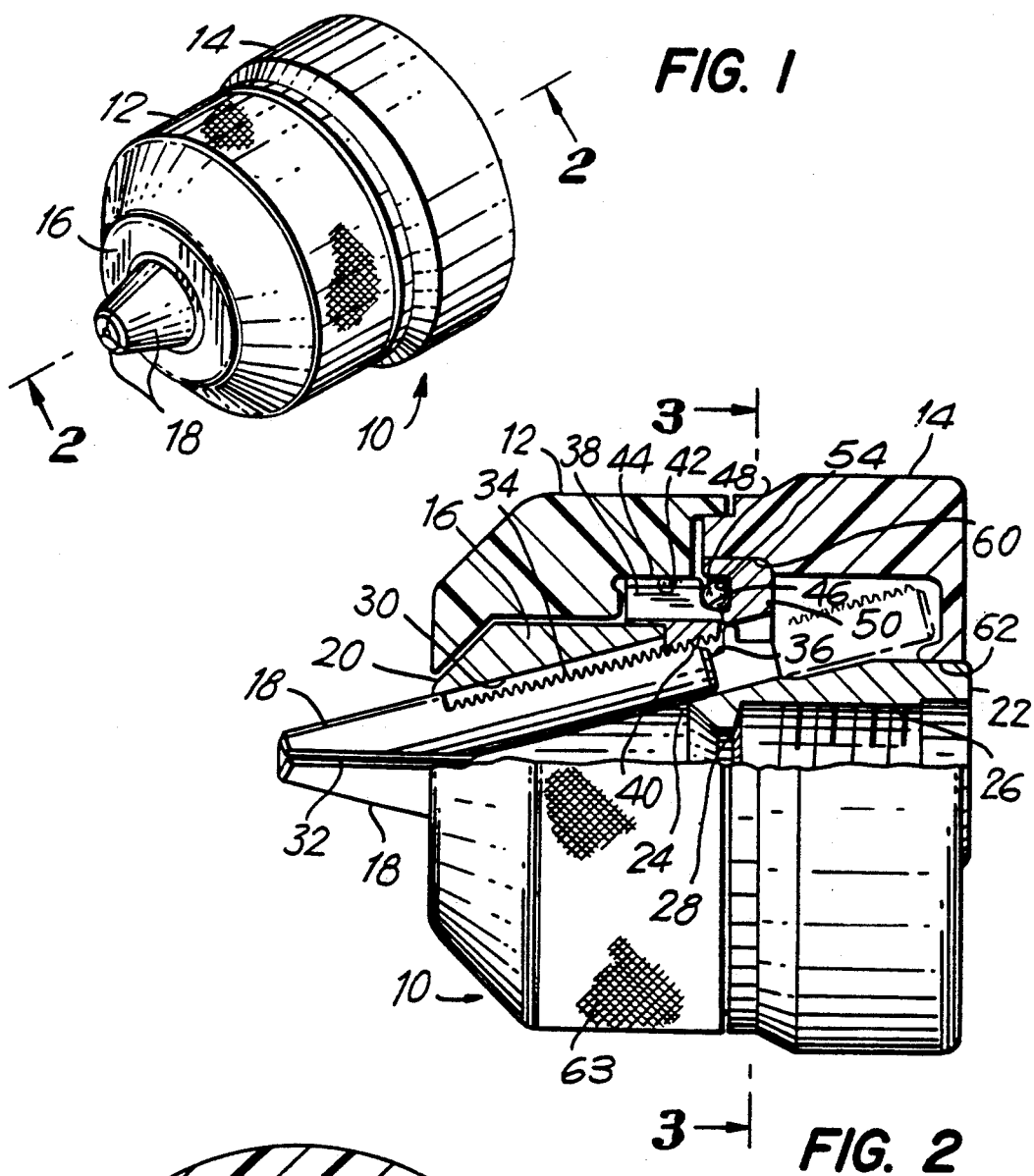
FIG. 1
FIG. 2
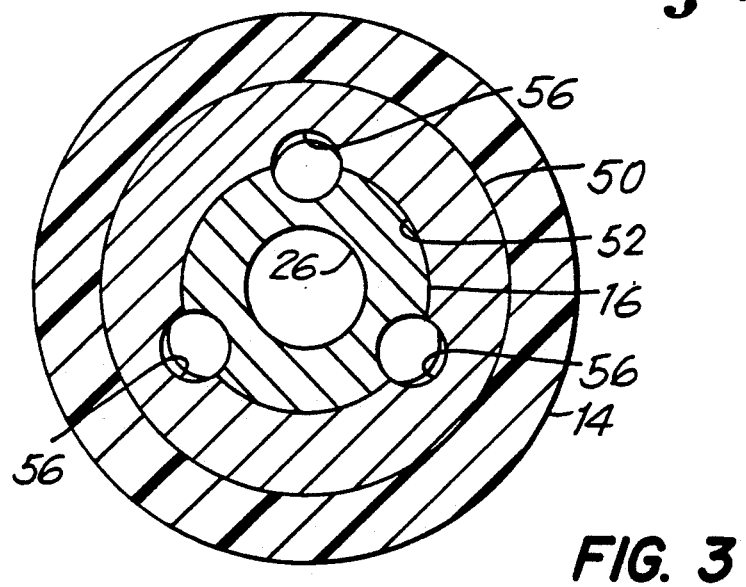
FIG. 3

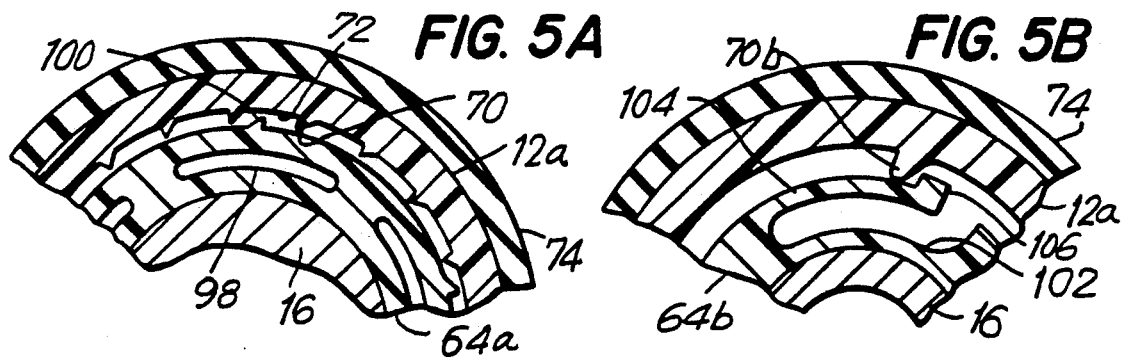
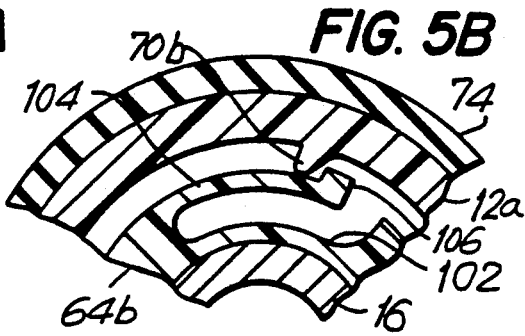
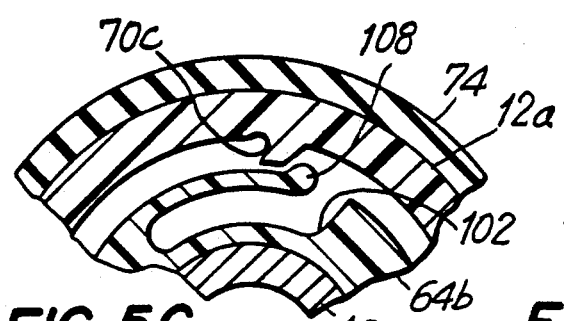
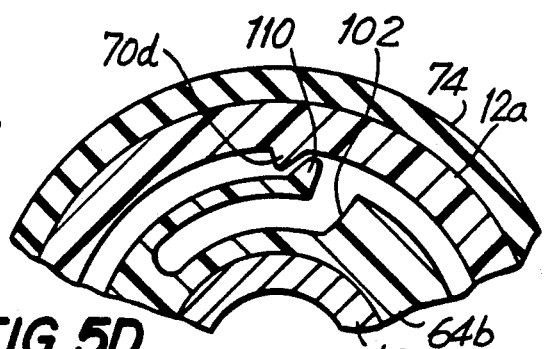
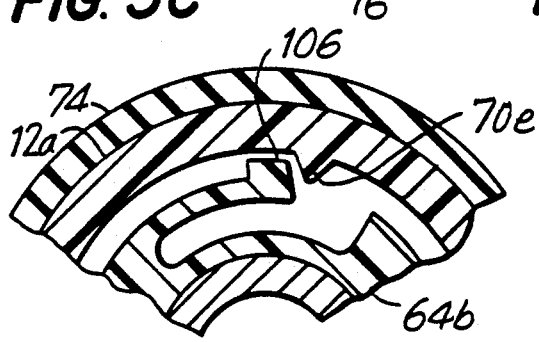
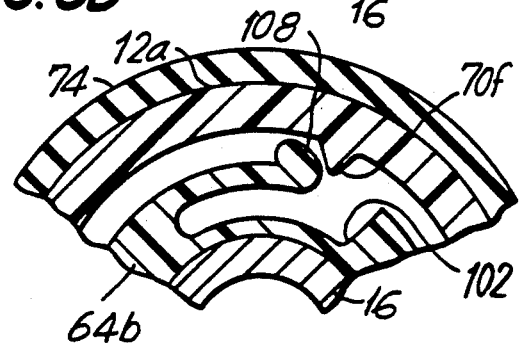
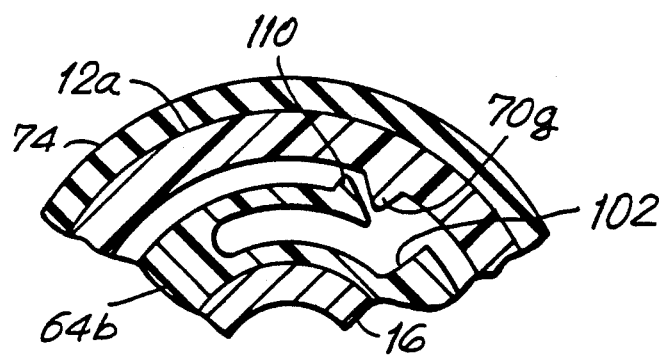

NON-IMPACT KEYLESS CHUCK

This is a division of application Ser. No. 07/884,205, filed May 18, 1992, now U.S. Pat. No. 5,253,879, entitled NON-IMPACT KEYLESS CHUCK, which was a division of application Ser. No. 07/449,722, filed Dec. 11, 1989, now U.S. Pat. No. 5,125,673.

BACKGROUND OF THE INVENTION

1. Field of the Invention

This invention relates to drill chucks for use with hand drills or with electric or pneumatic power drivers. More particularly, it relates to a chuck of the keyless type which may be tightened or loosened by hand or by actuation of the driver motor.

2. Prior Art

Both hand and electric or pneumatic tool drivers are well known. Although twist drills are the most common tools used with such drivers, the tools may also comprise screw drivers, nut drivers, burrs, mounted grinding stones and other cutting or abrading tools. Since the tools may have shanks of varying diameter or the cross-section of the tool shank may be polygonal, the device is usually provided with a chuck which is adjustable over a relatively wide range. The chuck may be attached to the driver by a threaded or tapered bore.

A wide variety of chucks has been developed by the art. In the simplest form of chuck, three jaws spaced circumferentially 120° apart from each other are constrained by a conical body threaded onto the drive shaft so that rotation of the body in one direction relative to the drive shaft forces the jaws into gripping relationship with respect to the cylindrical shank of a tool while rotation in the opposite direction releases the gripping relationship. Such a chuck may be keyless if the body is rotated by hand. However, because the tightening or loosening torque which may be applied directly in a hand operation is limited, the art developed the so-called three-jaw geared chuck. This design overcomes the principal problems in the earlier design by providing guideways in the chuck body to control more accurately the motion of the jaws and teeth on the jaws which mesh with a gear driven nut mounted on the chuck body. The gear is actuated by a pinion formed on a separate key which may be rotated in a bearing hole formed in the chuck body.

The three-jaw geared chuck is, or can be, a high quality precision tool which can exert a relatively large gripping force on the tool. However, the separate key may easily be misplaced or accidentally left in the chuck when the driver is actuated, thus possibly leading to some personal injury. In addition, the chucking or unchucking operation is a two-handed procedure which is time consuming.

To overcome these perceived disadvantages of the key operated gear chuck, various keyless chucks have now been developed. Such keyless chucks fall broadly into two classes: impact and non-impact chucks. Impact chucks employ means to apply a series of impacts to the nut so as to tighten or loosen the jaws. In the non-impact design, manual or mechanical means are used to restrain one member of the chuck while a torque is applied to another member of the chuck either manually or by the power driver to move the nut relative to the jaws. A keyless chuck of the impact type is disclosed in McCarthy U.S. Pat. No. 4,840,387 while the prior art cited therein illustrates keyless chucks both of the impact and the non-impact variety.

SUMMARY OF THE INVENTION

In accordance with the present invention, a keyless chuck of the non-impact type is provided. The invention employs an anti-friction bearing interposed between the nut and the body to decrease the friction losses in the mechanism so as to increase the effective tightening torque. The bearing thrust ring is formed separately from the body member and pressed thereon so as to increase the effective diameter of the body while minimizing the machining requirements. The principal load-bearing parts of the chuck, i.e., the jaws, body, nut, bearing and bearing race are formed from metal while the front and back sleeves and related parts may be formed from plastic materials so as to reduce the cost and permit customizing of the chuck. Additional features of the invention include an elastomeric grip boot for the front sleeve which also functions as a bit holder and centering device, a one-way torque limiting clutch for limiting the tightening torque while permitting positive loosening torque, and a torque-limiting clutch which provides greater loosening torque than tightening torque. In accordance with a process feature of the invention, the three jaws are identical with respect to their nut engaging threads and the eccentricity of their engagement is overcome by a grinding procedure following assembly of the chuck.

DESCRIPTION OF THE DRAWINGS

Further objects and advantages of the invention will become apparent from the following detailed description and the accompanying drawings in which:

FIG. 1 is a perspective view of a keyless chuck in accordance with the present invention, FIG. 2 is an enlarged longitudinal view, partly in section taken along line 2—2 of FIG. 1, FIG. 3 is a transverse cross-sectional view taken along line 3—3 of FIG. 2.

FIG. 5A–5G are fragmentary cross-sectional views showing alternative forms of the torque limiting mechanism.

DETAILED DESCRIPTION OF THE INVENTION

Figure 4:
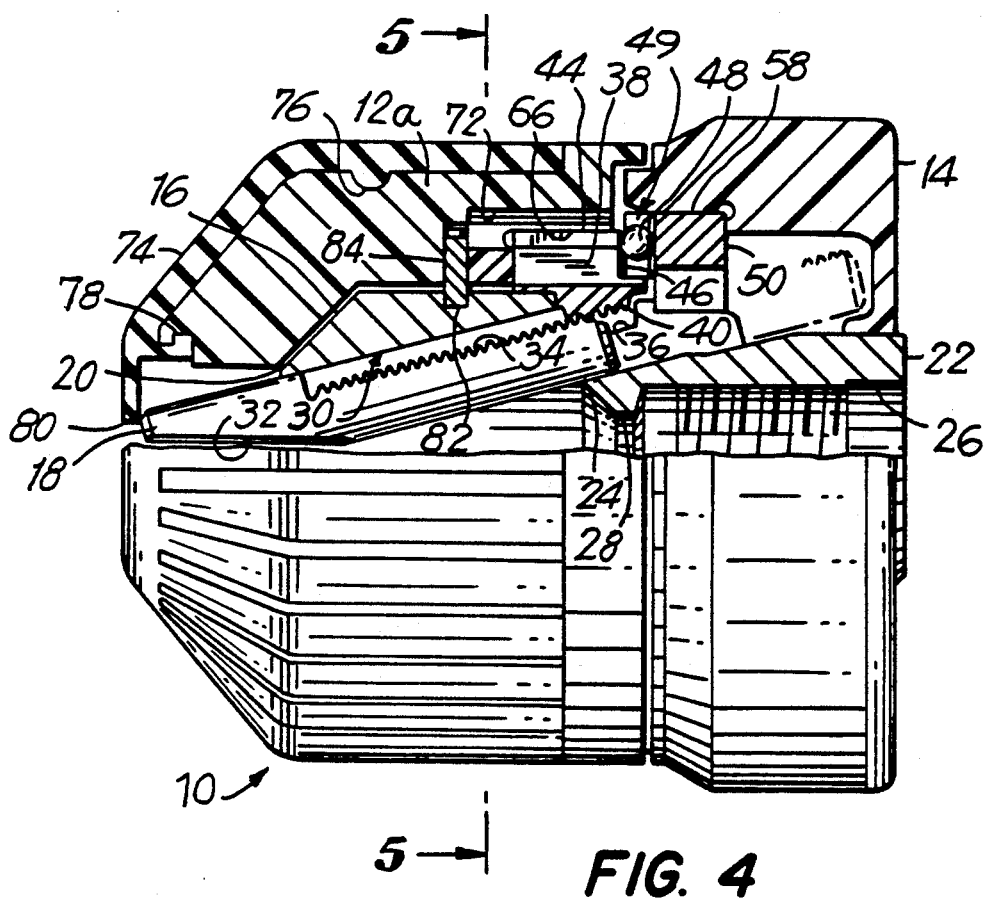
FIG. 4 is an enlarged longitudinal view, partly in section, of an alternative form of the invention including a torque limiting mechanism and a bit retaining and centering device.

Referring now to FIG. 1, there is illustrated a chuck 10 in accordance with the present invention. The chuck 10 includes a front sleeve member 12, an optional rear sleeve member 14, a body member 16 and jaws 18.

As shown more clearly in FIG. 2, the body member 16 is generally cylindrical in shape and comprises a nose or forward section 20 and a tail or rearward section 22. The nose section 20 is, preferably, chamfered at its outer end. An axial bore 24 is formed in the nose section 20 of the body member 16. Axial bore 24 is somewhat larger than the largest tool shank which the chuck is designed to accommodate. A threaded bore 26 is formed in the tail section 22 of the body 16 and is of a standard size to mate with the threaded drive shaft of a powered or hand driver (not shown). The bores 24, 26 may communicate at the central region 28 of the body member 16. If desired, the threaded bore 26 may be replaced by a tapered, unthreaded bore of a standard size to mate with a tapered drive shaft.

Passageways 30 are formed in the body member 16 to accommodate each jaw 18. Preferably, three jaws 18 are employed and each jaw 18 is separated from the adjacent jaw by an arc of 120°. The axes of the passageways 30 and the jaws 18 are angled with respect to the chuck axis but intersect the chuck axis at a common point ahead of the chuck body 16. Each jaw 18 has a tool engaging face 32 which is generally parallel to the axis of the chuck body 16 and threads 34 on its opposite or outer surface. In accordance with a feature of the present invention, the threads 34 have a relatively fine pitch, i.e., a pitch greater than 20 threads per inch, e.g., 32 threads per inch, and the threads, preferably, are of the buttress type though other thread forms may be employed. By employing the buttress thread form the tightening force applied to the jaw threads 34 is substantially axial to the jaw 18 so as to maximize the conversion of the tightening torque applied to the chuck into a gripping force applied to the tool shank. The use of a relatively fine pitch thread results in two advantages for the chuck in accordance with the present invention. First, the relatively fine pitch results in a greater mechanical advantage so that a given tightening torque is converted into a larger gripping force. Second, it becomes possible to use interchangeable jaws 18 of identical design rather than slightly different jaws that must be selected and assembled as a set. The small eccentricity which results from the use of identical jaw pieces in accordance with the present invention can be counteracted by a grinding step as more fully described below.

A circumferential groove 36 is formed in the body member 16 and extends into the passageways 30. A split nut 38 having female threads 40 is located in the circumferential groove 36 and secured therein by the front sleeve member 12. The split nut 38 is preferably formed with circumferential serrations or teeth 44 and the outer edges are provided with a small chamfer to facilitate press fitting of the split nut 38 into the bore 42 of the front sleeve 12. Preferably, the front sleeve is formed from a structural plastic such as a polycarbonate, a filled polypropylene, e.g., glass-filled polypropylene, or a blend of structural plastic materials. The serrations or teeth on the split nut 38 assure that the front sleeve 12 will hold the split nut 38 securely without being subjected to an excessive hoop stress.

A circumferential race 46, which may be grooved or a flat surface, is formed on the rear face of split nut 38 to accommodate an anti-friction bearing, for example, ball bearing assembly 48. If desired, the bearing assembly 48 may include a bearing retainer 49 (see FIG. 4) which locates the plurality of balls while permitting them to roll. A bearing thrust ring 50 is provided with a central hole 52 sized to be press fitted on the body member 16. One face of the bearing thrust ring 50 has formed thereon a bearing race 54, which may be grooved or flat, against which the bearing assembly 48 rides. A plurality of jaw guideways 56 are formed around the circumference of the central hole 52 in the thrust ring 50 to permit the retraction of the jaws 18 therethrough. The guideways are shaped to conform with the toothed area of the jaws 18 so as to reduce or prevent toggling of the jaws 18. To perform this function, the axial length of the guideways 56 must be greater than the pitch of the threads 34 on the jaws 18. The outer circumference of the bearing thrust ring 50 may have formed thereon serrations or teeth 58 and the outer edges may be chamfered so as to facilitate pressing of the bearing thrust ring 50 into a bore 60 formed in the rear sleeve member 14. The rear sleeve member 14 also contains a bore 62 adapted to mate with the tail section 22 of the body member 16. If desired, the rear sleeve member 14 may be omitted and the front sleeve member 12 extended to the tail end of the body 16. This alternative is feasible when a spindle lock is provided on the driver or when the driver is used to tighten or loosen the jaws.

The circumferential surface of the front sleeve member 12 may be knurled as suggested at 63 or may be provided with longitudinal ribs or other protrusions to enable the operator to grip it securely. In like manner, the circumferential surface of the rear sleeve member 14, if employed, may be knurled or ribbed, if desired.

It will be appreciated that the rear sleeve member 14 is fixed to the body member 16 while the front sleeve member 12 is fixed to the split nut 38. Thus, relative movement of the front and rear sleeve members 12, 14 will cause the jaws 18 to be advanced or retracted, depending upon the direction of the relative motion. As the bearing 48 is interposed between the relatively moving parts, the frictional losses are minimized and a maximum portion of the applied tightening torque is converted to a tightening force on the tool shank. While the chuck of FIGS. 2 and 3 may be operated manually, it may also be operated by the power driver.

As noted above, the jaws 18 are preferably formed so as to be identical to each other. In three-jaw geared chucks, it is common practice to offset the threads proportional to the thread pitch so that when the jaws contact each other they will meet on the axis of the chuck. By making the jaws identical a degree of eccentricity will result but this is minimized by the fine pitch of the threads. In accordance with the present invention, a grinding procedure may be performed after the chuck is assembled to remove the eccentricity resulting from the small axial displacement of the jaws relative to each other. When the eccentricity is removed, the centering accuracy of the chuck will be the same as if custom sets of jaws had been provided.

Figure 5:
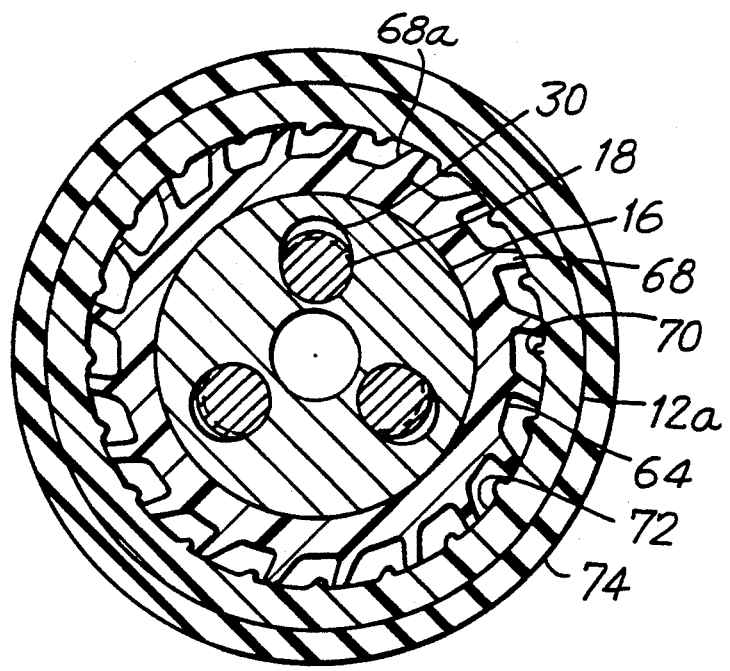
FIG. 5 is a transverse cross-sectional view taken along 5—5 of FIG. 4 and showing the torque limiting mechanism.

Reference is now made to FIGS. 4 and 5 which illustrate an alternative form of the present invention containing a torque limiting mechanism and a bit holding and centering device. Parts which are substantially the same as in the embodiment shown in FIGS. 2 and 3 are identified by the same designators while modified parts are designated with the additional letter "a."

In the embodiment shown in FIGS. 4 and 5 a torque limiting mechanism is provided which produces an audible "click" when the chuck has attained its maximum tightness. This may be accomplished by providing a toothed annulus 64 having a bore 66 which engages the outside diameter of, or the teeth or serrations 44 on, the split nut 38 so as to lock the split nut 38 in place. A series of flexible teeth 68 are formed on the circumference of the annulus 64 which engage ribs 70 formed on the lateral surface of a bore 72 in the front sleeve member 12a. As most clearly shown in FIG. 5 the flexible teeth 68 have a sloping forward edge 68a which engages the ribs 70 during tightening of the chuck. When a predetermined tightening torque is reached, the ribs 70 pass over the flexible teeth 68 producing an audible "click." However, when the front sleeve 12a is turned so as to loosen the chuck jaws 18, the ribs 70 lock with the teeth 68 to transfer all the applied torque to the split nut 38.

It will be noted that the front sleeve 12a extends beyond the nose 20 of the body member 16 to the region where the jaws 18 meet in their fully closed position. A grip boot 74 may be fastened to the front sleeve 12a by ribs 76, 78 and prevented from turning relative to the front sleeve 12a by longitudinal ribs (not shown). The grip boot 74 is preferably made from an elastomeric material such as natural or synthetic rubber and has a relatively small flexible orifice 80 aligned with the axis of the chuck body member 16. Preferably, the grip boot 74 is made from a relatively soft material having a Shore A hardness of from 40 to 70. The orifice 80 is sized so that it will stretch to grip the shank of a drill or other tool inserted in the chuck and temporarily center and restrain the tool during chucking or unchucking operations.

Figure 6A:
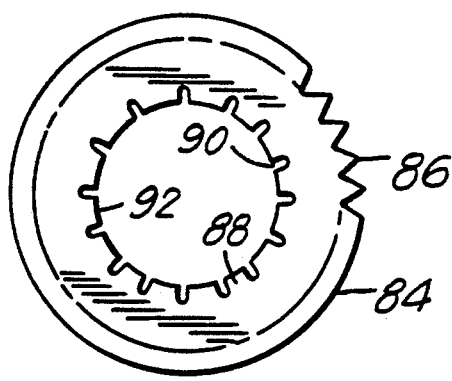
FIG. 6A is a plan view of a toothed retainer disc shown in FIG. 4.
Figure 6B:
FIG. 6B is an edge view, of the retainer disc shown in FIG. 6A.
Figure 6C:
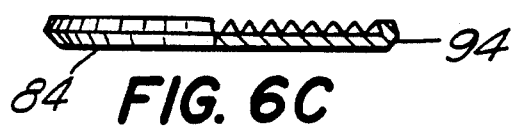
FIG. 6C is an edge view, partly in section, of an alternative form of the retainer disc having a beveled rim.
Figure 6D:
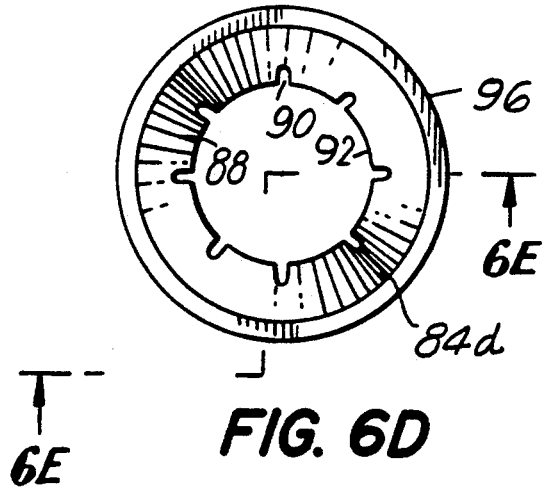
FIG. 6D is a plan view of a toothless retainer disc having a beveled rim.
Figure 6E:
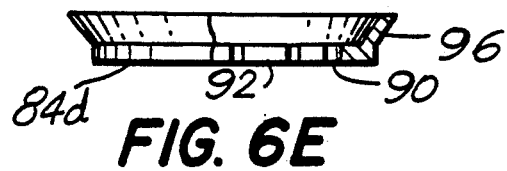
FIG. 6E is an edge view, partly in section, of the retainer disc shown in FIG. 6D.

In the embodiment of the invention shown in FIGS. 2 and 3, the front sleeve 12 is held in place because it is press fitted to the split nut 38. In the embodiment shown in FIGS. 4 and 5 other means are required to locate the front sleeve 12a. A circumferential groove 82 is formed in the nose section 20 of the body member 16 to receive a retainer disc 84 which is pressed into the bore 72 of the front sleeve 12a. FIG. 6A shows a plan view of the retainer disc 84 having circumferential teeth 86 and flexible engaging tabs 88 formed by a series of slots 90 stamped in the disc 84 around its center hole 92. As shown in FIG. 6B, the retainer disc 84 is flat and relatively thin so as to enable it to be pressed on to the body member 16 and turn freely in the groove 82. The retainer disc 84 is sized so that the teeth 86 firmly grip the bore 72 of the front sleeve member 12a. FIG. 6C illustrates an alternative form of a toothed retainer disc 84c having a beveled rim 94. FIG. 6D shows a toothless retainer disc 84d in plan view. Like the toothed retainer disc 84, the center hole 92 has slots 90 formed around its edge to define flexible engaging tabs 88. FIG. 6E shows the beveled rim 96 which forms a deformable gripping member.

As noted above with reference to FIG. 5, the toothed annulus 64 performs two functions: first, it holds the split nut 38 in place, and, second, it forms one part of the torque limiting mechanism. FIGS. 5A-5G illustrate a number of alternative designs for the toothed annulus 64. In FIG. 5A the annulus 64a is formed with a series of axial slots 98 located intermediate its inner and outer surfaces. A tooth 100 is located midway between the ends of each slot 98 which engages with the ribs or teeth 70 formed on the bore 72 of the front sleeve member 12a. The slots 98 provide the flexibility required for the tooth action while still maintaining the strength of annulus. In FIGS. 5B-5G further variations are shown in the design of the annulus. In FIG. 5B the annulus 64b is provided with a series of open slots 102 which result in a series of pawls 104 having a tooth 106 at the end thereof which engages the teeth 70b on the bore 72 of the front sleeve 12a. In FIG. 5B the tooth 106 has a square profile so that limited torque is transmitted when the sleeve 12a is rotated in a clockwise direction relative to the body 16 as viewed in FIG. 5B but unlimited torque is transmitted with counterclockwise rotation. This difference is due to the asymmetrical shape of the tooth 70b. FIG. 5C is similar to FIG. 5B except that the tooth 108 has a round rather than a square shape and the rear face of the tooth 70c has correlative shape. FIG. 5D is likewise similar to FIG. 5B except that the tooth 110 has a triangular rather than a square shape and the tooth 70d has a correlative asymmetric shape.

FIGS. 5E-5G show modifications of the structures respectively shown in FIGS. 5B-5D. In these modifications the tooth 70e, 70f, or 70g is designed to be substantially symmetrical about a radius of the front sleeve 12a so that the tightening torque and the loosening torque are substantially equal. It will be understood that the torque transmitted through the mechanism is principally a function of the angle of the surface of the teeth 70 and 68, 100, 106, 108 or 110, the coefficient of friction between the teeth, the force required to depress or deform the teeth 68, 100, 106, 108 or 110, and the number of teeth in contact. The torque increases as the tooth surface approaches a radius of the front sleeve, as the coefficient of friction increases, as the stiffness of the teeth on the annulus 64 increases, and as the number of teeth in contact increases. By appropriately controlling these variables, the desired tightening and loosening torque may be predetermined.

Figure 7:
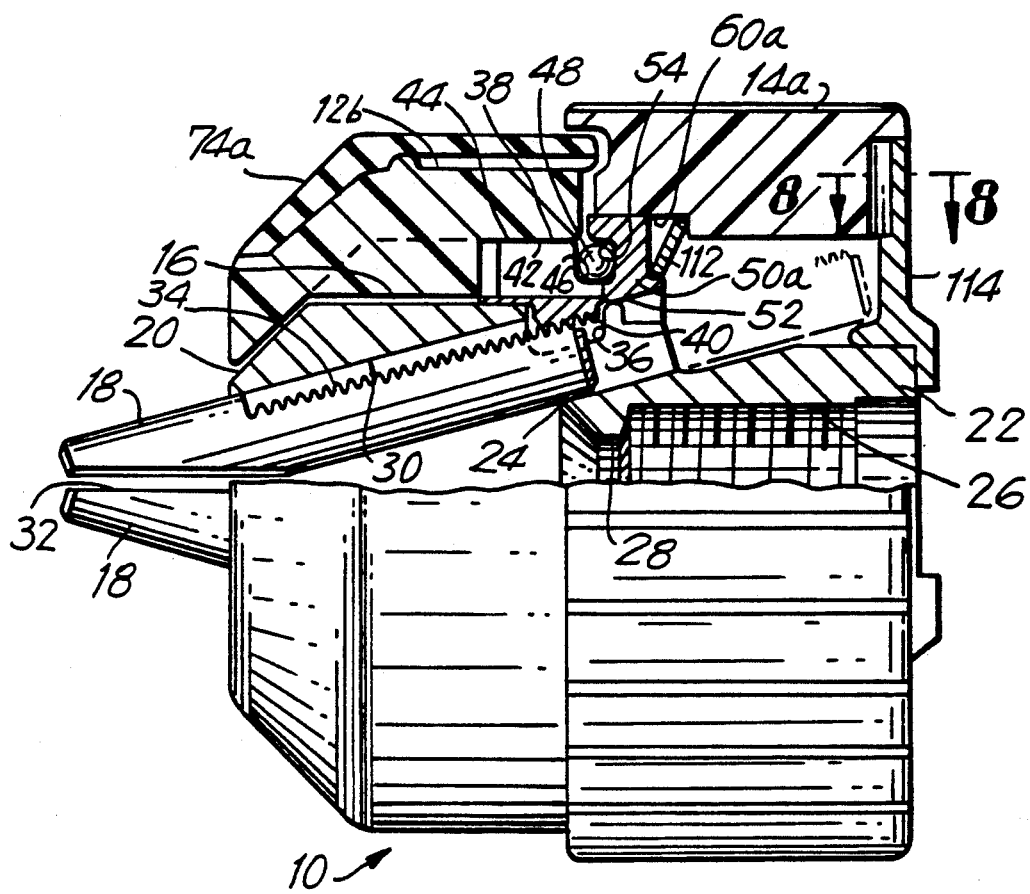
FIG. 7 is an enlarged longitudinal view, partly in section, of a further alternative form of the invention which is particularly adapted for manual operation.
Figure 8:
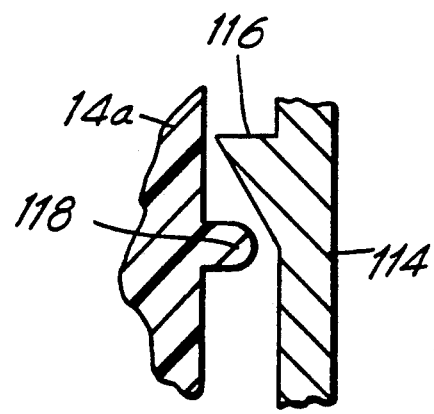
FIG. 8 is a fragmentary view taken along line 8—8 of FIG. 7 and showing the clutch mechanism.

Reference is now made to FIGS. 7 and 8 which show an embodiment of the present invention which is particularly adapted for manual operation. Again, parts which are substantially the same as in the earlier embodiments bear the same designations while modified parts are designated by "a" or "b." The embodiment of FIG. 7 is characterized by the location of the torque limiting mechanism in the rear sleeve member 14a. The basic structure of the body member 16, the jaws 18, and the split nut member 38 upon which the front sleeve member 12b is pressed is similar to that shown in FIG. 2 except that a grip boot 74a is applied to the surface of the front sleeve member 12b to enhance the grippability of the sleeve member. Grip boot 74a does not provide the tool holding feature shown in FIG. 4 but it is apparent that this feature could be added, if desired. The arrangement of bearing 48 and bearing thrust ring 50a is also similar to that shown in FIGS. 2 and 4 except that no serrations or teeth are formed on the outer periphery of the bearing thrust ring 50a. In the embodiment of FIG. 7, the bore 60a is sized for a sliding fit with the bearing thrust ring 50a and accommodates a Belleville or other form of compression spring 112 which biases the rear sleeve member 14a toward a back plate 114 which is press fitted onto the tail section 22 of the body member 16. As shown in FIG. 8, the back plate 114 may be provided with a plurality of teeth 116 and the rear sleeve member 14a provided with a plurality of radial ribs 118. It will be appreciated that during a chucking operation the rear sleeve 14a will be held while the front sleeve 12b is turned in a clockwise direction as viewed from the jaw end of the chuck. At a predetermined torque, the ribs 118 will ride over the teeth 116 while the rear sleeve 14a is displaced in a forward direction against the bias of the spring 112. The teeth 116 on the back plate 114 are designed to produce a limited tightening torque and an unlimited loosening torque. By varying the angle of the teeth faces and the spring rate of the compression spring 112 the tightening and loosening torque may be varied as desired and as explained above. Of course, the teeth 116 and the ribs 118 may be interchanged, if desired, and various shapes of teeth may be employed as suggested in FIGS. 5–5G The chuck in accordance with the present invention has a number of advantages with respect to the ease and cost of manufacture. The body member 16 may be machined from a relatively small diameter bar since the bearing thrust ring 50 is made separately and then pressed onto the body member. This reduces the machining costs for the body member. Certain parts, such as the split nut and bearing thrust ring may be formed from powdered metal or stamped or otherwise cold formed with limited machining steps. With this design of the load-bearing parts, the more massive front and rear sleeves may be formed from structural plastic materials thereby reducing weight and manufacturing costs while providing the ability to customize the chuck through the use of colors, rib shapes, knurling, or identification logos.

The terms and expressions which have been employed are used as terms of description and not of limitation and there is no intention in the use of such terms and expressions of excluding any equivalents of the features shown and described or portions thereof, but it is recognized that various modifications are possible within the scope of the invention claimed.

What is claimed is:

1. A chuck for use with a manual or powered driver having a rotatable drive shaft comprising a generally cylindrically body having a nose section and a tail section, said tail section having a first axial bore formed therein to mate with said drive shaft of said driver and said nose section having a second axial bore formed therein and a plurality of angularly disposed passageways formed therethrough and intersecting said second axial bore and an exterior surface of said body, a plurality of jaws slidably positioned in each of said angularly disposed passageways, each of said jaws having a jaw face formed on one side thereof and threads formed on the opposite side thereof, a nut rotatably mounted on said body substantially concentric with said body, said nut being in threaded engagement with said threads on said jaws, and a generally cylindrical front sleeve member overlying said nose section of said body and being permanently rotatably and axially fixed on said nut, wherein said nut has substantially axially directed serrations formed around its circumferential surface, said serrations projecting radially out from the remainder of said nut so that when said front sleeve member is pressed on to said nut, said serrations dig into said front sleeve member in order to cause the material of said front sleeve member to interdigitate with said serrations and thereby rotatably fix said front sleeve member on said nut without subjecting said front sleeve member to excessive hoop stress.

2. The chuck defined in claim 1 wherein said front sleeve member is made of a structural plastic material.

3. The chuck defined in claim 2 wherein said structural plastic material comprises polycarbonate.

4. The chuck defined in claim 2 wherein said structural plastic material comprises a filled polypropylene.

5. The chuck defined in claim 2 wherein said structural plastic material comprises glass-filled polypropylene.

6. The chuck defined in claim 1 further comprising a generally cylindrical rear sleeve member overlying said tail section of said body and being permanently rotatably and axially fixed on said body, wherein said tail section of said body has substantially axially directed tail section serrations formed around its circumferential surface, said tail section serrations projecting radially out from the circumferentially adjacent remainder of said tail section so that when said rear sleeve member is pressed on to said tail section, said tail section serrations dig into said rear sleeve member in order to cause the material of said rear sleeve member to interdigitate with said tail section serrations and thereby rotatably fix said rear sleeve member on said tail section without subjecting said rear sleeve member to excessive hoop stress.

7. The chuck defined in claim 6 wherein said rear sleeve member is made of a structural plastic material.

8. The chuck defined in claim 7 wherein said structural plastic material comprises polycarbonate.

9. The chuck defined in claim 7 wherein said structural plastic material comprises a filled polypropylene.

10. The chuck defined in claim 7 wherein said structural plastic material comprises glass-filled polypropylene.

11. A chuck for use with a manual or powered driver having a rotatable drive shaft comprising a generally cylindrically body having a nose section and a tail section, said tail section having a first axial bore formed therein to mate with said drive shaft of said driver and said nose section having a second axial bore formed therein and a plurality of angularly disposed passageways formed therethrough and intersection said second axial bore and an exterior surface of said body, a plurality of jaws slidably positioned in each of said angularly disposed passageways, each of said jaws having a jaw face formed on one side thereof and threads formed on the opposite side thereof, a nut rotatably mounted on said body substantially concentric with said body, said nut being in threaded engagement with said threads on said jaws, and a generally cylindrical front sleeve member overlying said nose section of said body and being permanently rotatably and axially fixed on said nut, wherein said nut has substantially axially directed teeth formed around its circumferential surface, said teeth projecting radially out from the remainder of said nut so that when said front sleeve member is pressed on to said nut, said teeth dig into said front sleeve member in order to cause the material of said front sleeve member to interdigitate with said teeth and thereby rotatably fix said front sleeve member on said nut without subjecting said front sleeve member to excessive hoop stress.

12. The chuck defined in claim 11 wherein said front sleeve member is made of a structural plastic material.

13. The chuck defined in claim 12 wherein said structural plastic material comprises polycarbonate.

14. The chuck defined in claim 12 wherein said structural plastic material comprises a filled polypropylene.

15. The chuck defined in claim 12 wherein said structural plastic material comprises glass-filed polypropylene.

16. The chuck defined in claim 11 further comprising a generally cylindrical rear sleeve member overlying said tail section of said body and being permanently rotatably and axially fixed on said body, wherein said tail section of said body has substantially axially directed tail section teeth formed around its circumferential surface, said tail section teeth projecting radially out from the circumferentially adjacent remainder of said tail section so that when said rear sleeve member is pressed on to said tail section, said tail section teeth dig into said rear sleeve member in order to cause the material of said rear sleeve member to interdigitate with said tail section teeth and thereby rotatably fix said rear sleeve member on said tail section without subjecting said rear sleeve member to excessive hoop stress.

17. The chuck defined in claim 16 wherein said rear sleeve member is made of a structural plastic material.

18. The chuck defined in claim 17 wherein said structural plastic material comprises polycarbonate.

19. The chuck defined in claim 17 wherein said structural plastic material comprises a filled polypropylene.

20. The chuck defined in claim 17 wherein said structural plastic material comprises glass-filled polypropylene.

21. A chuck for use with a manual or powered driver having a rotatable drive shaft comprising a generally cylindrical body having a nose section and a tail section, said tail section having a first axial bore formed therein to mate with said drive shaft of said driver and said nose section having a second axial bore formed therein and a plurality of angularly disposed passageways formed therethrough and intersecting said second axial bore and an exterior surface of said body, a plurality of jaws slidably positioned in each of said angularly disposed passageways, each of said jaws having a jaw face formed on one side thereof and threads formed on the opposite side thereof, a nut rotatably mounted on said body substantially concentric with said body, said nut being in threaded engagement with said threads on said jaws, and a generally clindrical rear sleeve member overlying said tail section of said body and being permanently rotatably and axially fixed on said body, wherein said tail section of said body has substantially axially directed serrations formed around its circumferential surface, said serrations projecting radially out from the circumferentially adjacent remainder of said tail section so that when said rear sleeve member is pressed on to said tail section, said serrations dig into said rear sleeve member in order to cause the material of said rear sleeve member to interdigitate with said serrations and thereby rotatably fix said rear sleeve member on said tail section without subjecting said rear sleeve member to excessive hoop stress.

22. The chuck defined in claim 21 wherein said rear sleeve member is made of a structural plastic material.

23. The chuck defined in claim 22 wherein said structural plastic material comprises polycarbonate.

24. The chuck defined in claim 22 wherein said structural plastic material comprises a filled polypropylene.

25. The chuck defined in claim 22 wherein said structural plastic material comprises glass-filled polypropylene.

26. A chuck for use with a manual or powered driver having a rotatable drive shaft comprising a generally clindrical body having a nose section and a tail section, said tail section having a first axial bore formed therein to mate with said drive shaft of said driver and said nose section having a second axial bore formed therein and a plurality of angularly disposed passageways formed therethrough and intersecting said second axial bore and an exterior surface of said body, a plurality of jaws slidably positioned in each of said angularly disposed passageways, each of said jaws having a jaw face formed on one side thereof and threads formed on the opposite side thereof, a nut rotatably mounted on said body substantially concentric with said body, said nut being in threaded engagement with said threads on said jaws, and a generally cylindrical rear sleeve member overlyings aid tail section of said body and being permanently rotatably and axially fixed on said body, wherein said tail section of said body has substantially axially directed teeth formed around its circumferential surface, said teeth projecting radially out from the circumferentially adjacent remainder of said tail section so that when said rear sleeve member is pressed on to said tail section, said teeth dig into said rear sleeve member in order to cause the material of said rear sleeve member to interdigitate with said teeth and thereby rotatably fix said rear sleeve member on said tail section without subjecting said rear sleeve member to excessive hoop stress.

27. The chuck defined in claim 26 wherein said rear sleeve member is made of a structural plastic material.

28. The chuck defined in claim 27 wherein said structural plastic material comprises polycarbonate.

29. The chuck defined in claim 27 wherein said structural plastic material comprises a filled polypropylene.

30. The chuck defined in claim 27 wherein said structural plastic material comprises glass-filled polypropylene.

* * * * *